United States Patent
Swenson, Sr. et al.

[11] Patent Number: 5,148,720
[45] Date of Patent: Sep. 22, 1992

[54] LOCK-UP SOLENOID ASSEMBLY

[76] Inventors: Roger M. Swenson, Sr., Rte. #2 Box 49, Williamsville, Mo. 63967; Roger M. Swenson, Jr., 731 Pershing Apt. #2, Poplar Bluff, Mo. 63901

[21] Appl. No.: 758,828

[22] Filed: Sep. 12, 1991

[51] Int. Cl.$^5$ .............................................. F16H 57/02
[52] U.S. Cl. .................... 74/606 R; 411/389
[58] Field of Search ............ 74/606 R; 411/107, 424, 411/388, 389, 999; 403/337, 408.1

[56] References Cited

U.S. PATENT DOCUMENTS

| 3,897,713 | 8/1975 | Gugle | 411/389 |
| 4,334,815 | 6/1982 | Knohl | 411/389 X |
| 4,928,531 | 5/1990 | Schult et al. | 411/107 X |
| 5,025,682 | 6/1991 | McCabe et al. | 74/606 R |

FOREIGN PATENT DOCUMENTS 0566552  1/1945  United Kingdom ................ 411/424

Primary Examiner—Rodney H. Bonck
Assistant Examiner—Andrea Pitts
Attorney, Agent, or Firm—Jim Zegger

[57] ABSTRACT

A conventional lock-up solenoid having a long delivery tube and mounting bracket with outwardly extending mounting legs is mounted on a transmission torque converter case requiring a lock-up solenoid with a short delivery sleeve. This is accomplished by a spacer member constituted by a pair of spacers carried on threaded studs which are received in the tapped holes. In effect, the spacer shortens the long delivery tube so that it fits the space of a short delivery tube lock-up solenoid. If the transmission is one requiring a long delivery tube, it is installed without the spacer and as any other replacement lock-up solenoid.

2 Claims, 2 Drawing Sheets

LOCK-UP SOLENOID ASSEMBLY

BACKGROUND AND BRIEF DESCRIPTION OF THE INVENTION

The lock-up solenoid in transmissions closes-off a fluid passage which allows pressure to build-up in the chamber and move a valve to open a passageway so that the front portion of the torque converter can empty itself which allows the normal pressure in the converter to push a piston making a lock-up condition which is similar to a clutch. The lock-up solenoid includes a solenoid coil which actuates a plunger to restrict a hole at the end of a delivery sleeve. A mounting bracket has mounting legs which are secured to the casing by a pair of bolts received in threaded or tapped holes in the transmission casing. The delivery sleeve or tube carriers an "0" ring at the enlarged nose end of the delivery sleeve to seal the delivery sleeve with the pump mounted inside the transmission case. The delivery tube passes into the transmission casing to include the nose and "0" ring to engage the pump.

While the function and structure of the lock-up solenoid for several transmissions are the same, the lock-up solenoids are not interchangeable: the delivery sleeves are of different lengths. This means that two separate parts have to be stocked. In replacement situations this can mean that the parts dealer has to stock two lock-up solenoids that are not interchangeable.

The object of the present invention is to provide a lock-up solenoid system in which the lock-up solenoid has a one size (long) delivery sleeve and can be used on several types of transmissions.

According to the invention, a conventional lock-up solenoid having a long delivery tube and mounting bracket with outwardly extended mounting legs is mounted on a transmission transmission case requiring a lock-up solenoid with a short delivery sleeve. This is accomplished by a pair of spacers carried on threaded studs which are received in the tapped holes. In effect, the spacer shortens the long delivery tube so that it fits the space of a short delivery tube lock-up solenoid. If the transmission is one requiring a long delivery tube it is installed as any other replacement lock-up solenoid.

DESCRIPTION OF THE DRAWINGS

The above and other objects, advantages and features of the invention will become more apparent when considered in conjunction with the following specification and accompanying drawings wherein.

DETAILED DESCRIPTION OF THE INVENTION

Figure 1:
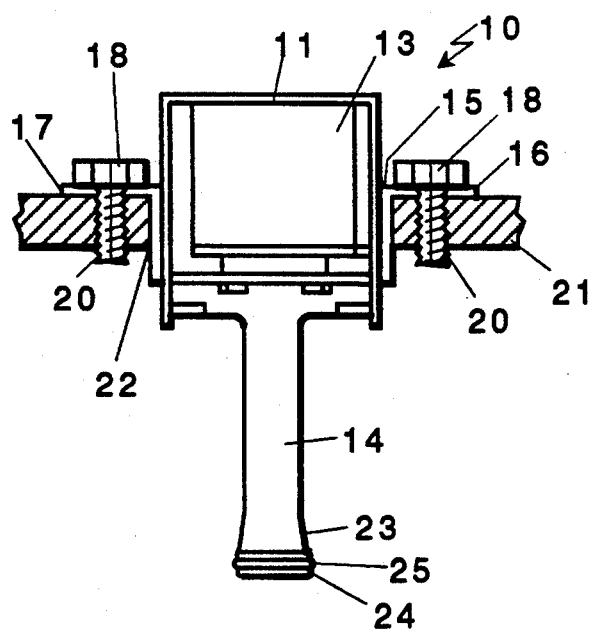
FIG. 1 is a side view illustrating a lock-up solenoid with a long delivery tube.

Referring to FIG. 1 (prior art), a lock-up solenoid assembly 10 has a frame 11 supporting operating solenoid 13 and a delivery sleeve or tube 14. A bracket 15 has a laterally extending legs 16, 17 which are secured by threaded bolts 18 in threaded or tapped holes 20 in transmission casing 21, with a portion of the lock-up solenoid assembly fitting within a hole 22 in transmission casing 21. The lower or distal end 23 of delivery sleeve 14 has a nose portion 24 carrying an "0" ring seal 45 engaged with a pump (not shown) in the transmission. Wires 25 (FIG. 4) supplying operating potentials to the solenoid carry connectors which preferably are of the type shown in my application Ser. No. 07/758,833 filed Sep. 12, 1991 for "QUICK CONNECT ELECTRICAL CONNECTOR", and incorporated herein by reference.

When the lock-up solenoid has to be replaced, the bolts 18 are removed, electrical wires to the solenoid are cut (as close to the solenoid coil 13 as possible). If the transmission is of the type requiring a long delivery sleeve, the wire ends are reconnected with pigtail leads supplied with the new lock-up solenoid and the bolts 18 used to secure the solenoid on the transmission casing. (This would be the procedure with General Motors 700 R4-type transmissions.)

Figure 2:
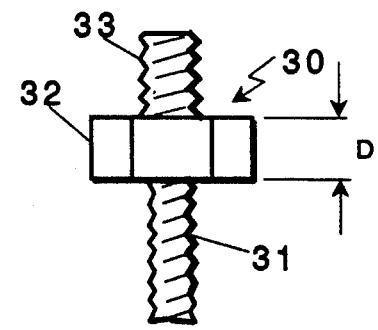
FIG. 2 is a side view of an adaptor spacer stud.
Figure 5:
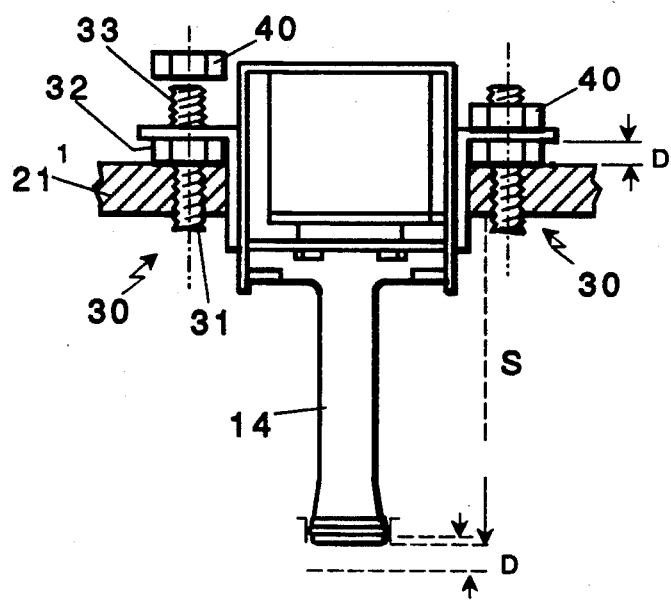
FIG. 5 is a side elevations view showing the lock-up solenoid mounted on the adapter spacer studs.

However, when the transmission is of the type requiring a shorter delivery sleeve (such as General Motors 200 4R transmissions), in accordance with the invention, a pair of spacer studs 30, shown enlarged in detail in FIG. 2 are used. Spacer studs 30 have a lower threaded portion 31, spacer member 32 and upper threaded portion 33. Lower threaded portion 31 has the same size and thread pitch as threaded holes 20 in the transmission casing 21'. Spacer member 32 has a thickness D and when the laterally extended legs 16, 17 of the mounting bracket 15 are resting thereon, the spacer effectively shortens the length of long delivery sleeve 14 so that seal ring 25 is properly positioned in sealing relation with the pump. The upper threaded portion 33 has a slightly larger diameter, but could obviously be the same as the lower portion 31.

Figure 4:
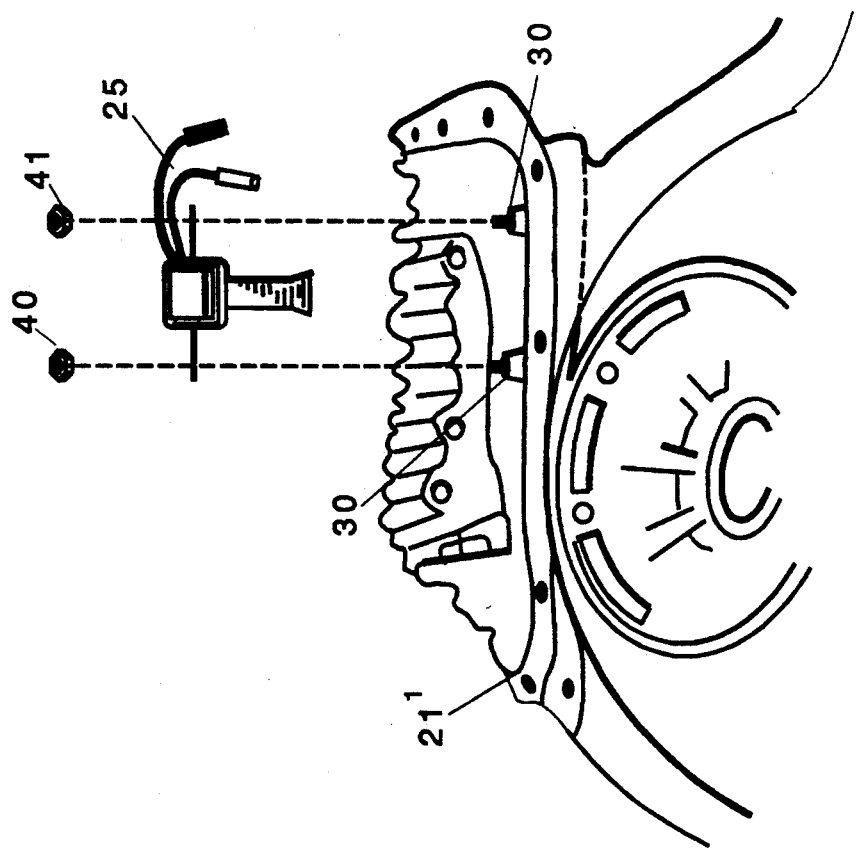
FIG. 4 is a diagrammatic view of the upside down transmission showing adapter spacer studs installed and the lock-up solenoid being installed.
Figure 3:
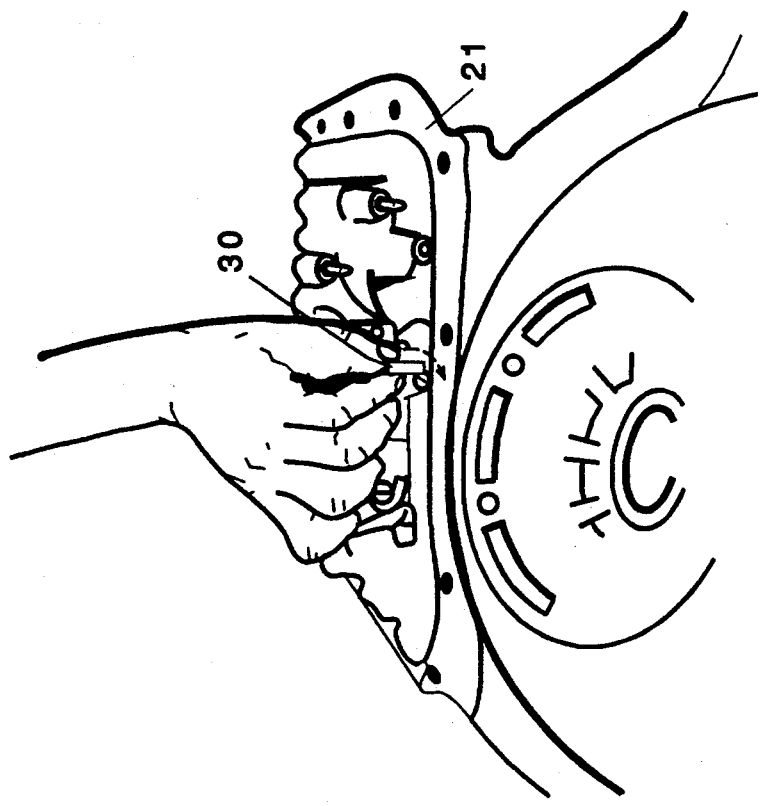
FIG. 3 is a diagrammatic view of an upside down transmission with pan removed, and the mechanic's hand installing an adapter spacer stud.

In FIG. 3, the mechanic is installing a spacer stud 30 in threaded bore 20 in casing 21', the arrow indicates direction of rotation. Spacer member 32 is hexagon-shaped so the stud can be tightened firmly with a wrench. After the pair of spacer studs 30 are installed on casing 21', as shown in FIG. 4, the legs 16, 17 of the bracket 15 are fitted on the top of the spacer member and nuts tighten the solenoid in place.

The spacer members 32 effectively shorten the length of the delivery sleeve 14 by the distance D so the distance S from the casing to the pump is correct.

While there has been shown and described a preferred embodiment of the invention, it will be appreciated that other modifications and adaptations of the invention be readily apparent to those skilled in the art.

What is claimed is:

1. A replacement lock-up solenoid system for a pair of automatic transmissions wherein the lock-up solenoid for one transmission has a delivery sleeve which is longer by a distance D than the corresponding delivery sleeve of the other solenoid and wherein each solenoid is mounted on its respective transmission casing by at least a pair of bolts, each solenoid includes a bracket having outwardly extending legs, and said bolts pass through the respective legs and into threaded engagement with said threaded holes in said transmission casing, said replacement lock-up solenoid for both said transmissions having long delivery sleeve, and means for adjusting the mounting of said other lock-up solenoid on its respective transmission casing comprising a pair of threaded studs, spacing members on said threaded studs, respectively, said spacing member spacing said lock-up solenoid with a long delivery sleeve the length D and a threaded stud projection extending above said spacing member, respectively, and a nut engaged with each said threaded stud extensions, respectively.

2. A lock-up solenoid system for at least a pair of transmissions wherein the lock-up solenoid of one transmission has a delivery sleeve which is longer by a distance D than the delivery sleeve of a corresponding the lock-up solenoid for another of said at least a pair of transmissions, and wherein each lock-up solenoid is mounted on its respective transmission casing by at least a pair of bolts received in threaded holes on said transmission casing, each lock-up solenoid includes a bracket having outwardly extending legs, and said bolts pass through the respective legs and into threaded engagement with said threaded holes in said transmission casings, respectively, said lock-up solenoid for both said transmissions having long delivery sleeve, and means for adjusting the mounting of said lock-up solenoid on said another of said at least a pair of transmission casing comprising, spacing means for spacing the bracket of said lock-up solenoid with a long delivery sleeve above said transmission casing the distance D, and threaded bolt means passing through said legs and into threaded engagement with said threaded holes in said transmission casing.

* * * * *